Patented May 9, 1950

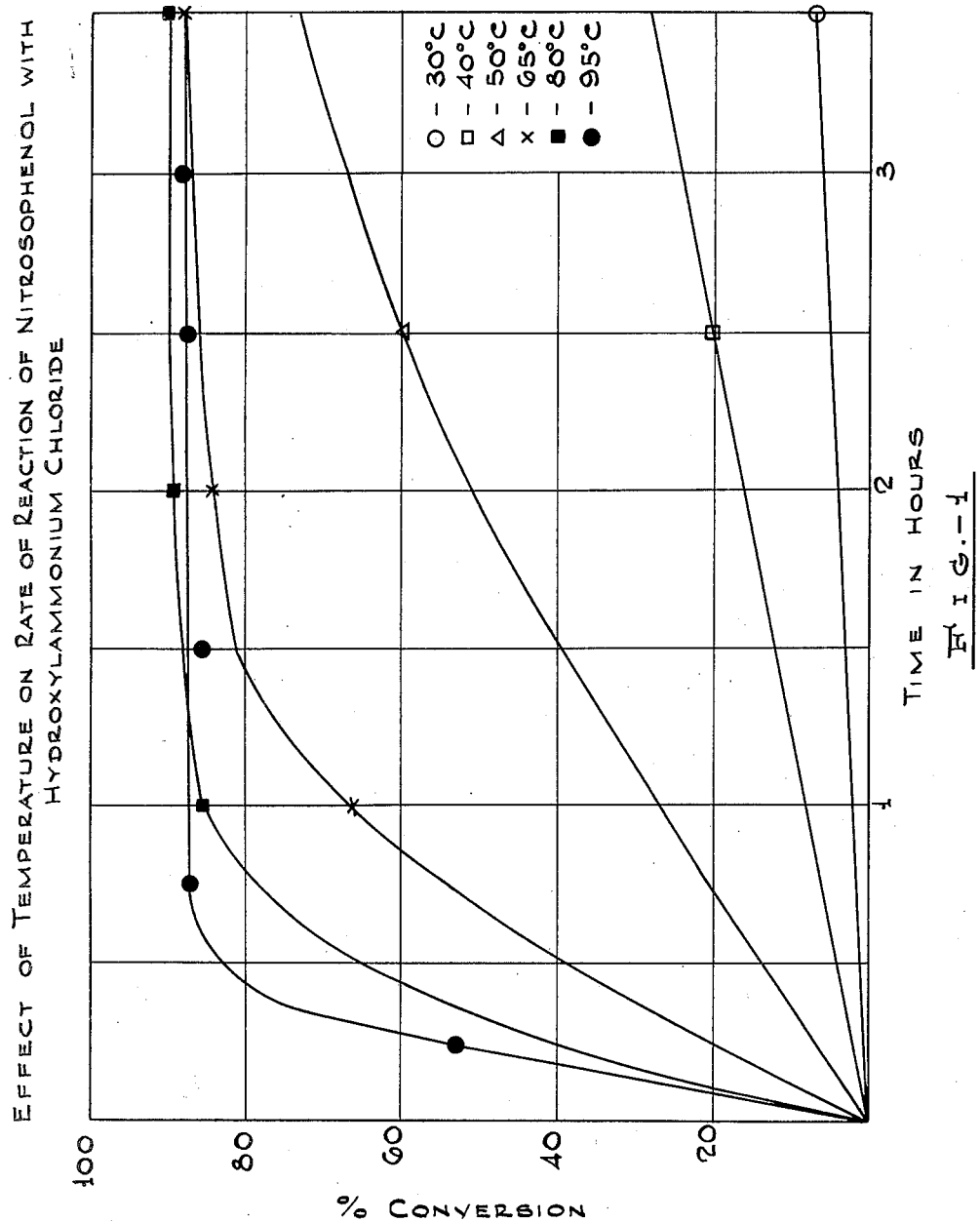

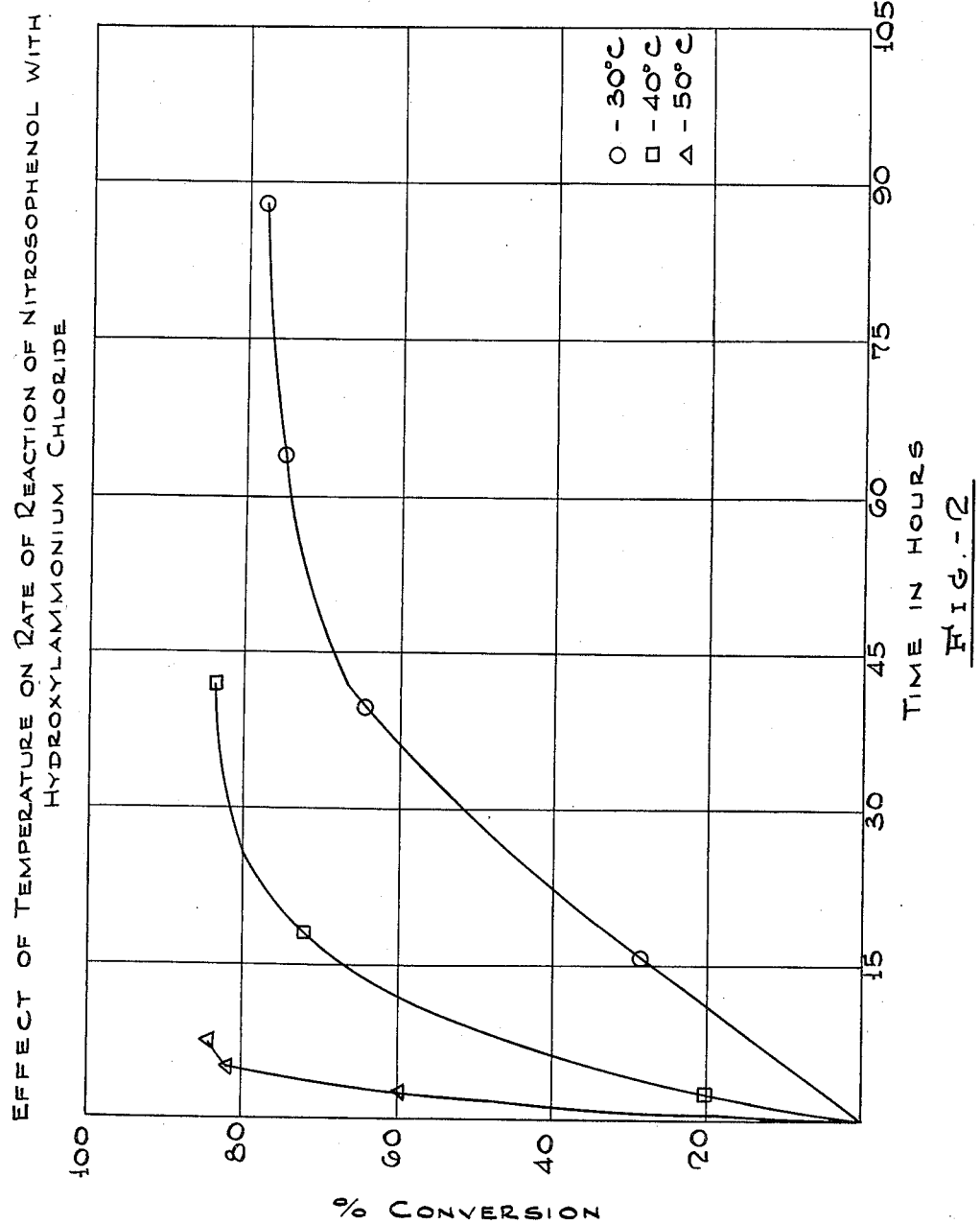

2,507,112

UNITED STATES PATENT OFFICE 2,507,112

PREPARATION OF PARA-QUINONE DIOXIME

Samuel B. Lippincott and Louis A. Mikeska, Westfield, N. J., assignors to Standard Oil Development Company, a corporation of Delaware Application January 18, 1947, Serial No. 722,842

10 Claims. (Cl. 260—396)

This invention relates to an improved method of preparing para-quinone dioxime. More particularly, the invention consists in an improvement in the known method of preparing para-quinone dioxime wherein nitrosophenol is reacted with hydroxylamine.

Para-quinone dioxime is a solid varying in color from light brown to dark brown. It has a specific gravity of approximately 1.21. It decomposes above about 215° C. and explosively so around about 270° C. It is slightly soluble in acetone and insoluble in water, gasoline, benzol and ethylene dichloride. These are the physical properties of the product as obtained commercially.

Para-quinone dioxime is a very rapid vulcanizing agent when used in conjunction with an oxidizing agent such as lead oxide in the vulcanization of natural rubber and also of some synthetic rubbers. When so used, it produces fast curing high modulus stocks. It also acts well when used in conjunction with other accelerators such as thiuram, dithiocarbamate, etc., although sulfur or sulfur containing compounds are not necessary for the vulcanization.

Several methods for the preparation of p-quinone dioxime have been described in the literature. For example, Nietzki et al, Berichte vol. 20: 614 (1887) produce p-quinone dioxime by the reaction of quinone or hydroquinone with hydroxylamine hydrochloride. Fisher and Hepp, Berichte, vol. 21: 685 (1888), use nitrosoaniline in the reaction with hydroxylamine hydrochloride, and Wohl, Berichte, 36: 4137 (1903) employs nitrosodiphenylaniline. Another reaction reported is that of nitrosobenzylaniline with hydroxylamine hydrochloride, cf. Annalen volume 263, page 304 (1891). Nietzki and Guiterman, Berichte, vol. 21: 429 (1888), prepared the dioxime from nitrosophenol using 100% excess hydroxylammonium chloride. They carried out the reaction at room temperature for a period of 6–8 days. From 94 g. of phenol, they obtained 55 g. of p-quinone dioxime, i. e., 40% yield on the basis of phenol, 20% yield on the basis of hydroxylamine.

The object of our invention is to produce p-quinone dioxime by reacting nitrosophenol with hydroxylamine to produce greater yields of dioxime.

Another object of our invention is to shorten considerably the time of reaction required to produce substantially greater yields of the dioxime.

Another object of our invention is to bring about the production of substantial yields of the dioxime at a considerable savings of time and materials over the previously known method.

These and other objects of our invention are accomplished by carrying out the reaction of nitrosophenol with hydroxylamine at a temperature of 40°–100° C., preferably 45°–65° C. Furthermore, we have found that the addition of free acid to the reaction mixture, as recommended by Nietzki and Guiterman is not only unnecessary but also undesirable.

By carrying out the reaction under conditions outlined above, and which will be further explained below, we bring about the following improved results:

1. Higher yields of p-quinone dioxime, i. e., about 100%, based on the nitrosophenol, and 75–80% based on the hydroxylamine. These yields compare with the 50% and 25% yields respectively, previously reported for this method.

2. Reduction of the reaction time by about 80%, at the same time producing these higher yields.

3. No free acid is required, thus further assisting in the economy of the process.

4. Hydroxylamine excess is recovered.

Apparently nothing has been published on the preparation of p-quinone dioxime by this method since the work of Nietzki and Guiterman. (Ber. 21, 429 (1888)). They prepared the dioxime from nitrosophenol using 100% excess hydroxylammonium chloride. The reaction was carried out at room temperature for a period of 6–8 days. From 94 g. of phenol they obtained 55 g. of p-quinone dioxime, i. e., 40% yield on the basis of phenol, 20% yield on the basis of hydroxylamine.

Our procedure for the preparation of p-quinone dioxime will be stated below. Given also, are the methods for preparing the reactants, viz., nitrosophenol and hydroxylammonium sulfate as would be required for economic plant scale production of the dioxime.

PREPARATION OF P - QUINONE DIOXIME FROM NITROSOPHENOL AND HYDROXYLAMINE (a) *Preparation of nitrosophenol from phenol*

$$C_6H_5OH + NaNO_2 + \tfrac{1}{2}H_2SO_4 \rightarrow$$
$$O=C_6H_4=NOH + \tfrac{1}{2}Na_2SO_4 + H_2O$$

From 60 g. of phenol, 54 g. of sodium nitrite, 27 g. of sodium hydroxide and 1500 ml. of water, an average of about 55 g. (70% yield) of nitrosophenol (quinone monoxime) was obtained. (Bridge, Ann. 277, 85 (1893); 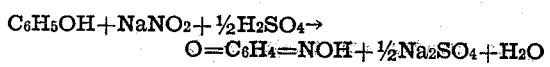

Chimie II, page 673 (1937), claim yields of 75–85%. Some patents claim even higher yields.)

It is not necessary to dry the nitrosophenol. In fact, it is safer not to, for dry nitrosophenol has been known to ignite spontaneously. The wet cake could be transferred directly to the dioxime reaction.

(b) Preparation of hydroxylammonium sulfate

The procedure described by Semon (organic Syntheses, Collective volume I, page 311) for the preparation of hydroxylammonium chloride was modified to yield a solution of hydroxylammonium acid sulfate.

One hundred and twenty-six grams (1.74 moles) of technical sodium nitrite and one kilogram of chopped ice were placed in a flask chilled by means of an ice-salt mixture. A cold (5°) solution of sodium bisulfite, made by saturating with sulfur dioxide a solution of 99 g. (0.94 mole) of anhydrous sodium carbonate in 300 ml. of water, was added slowly with hand stirring. The mechanical stirrer was started, and a stream of sulfur dioxide passed in, with continual stirring, the temperature being kept at 0°–2° C., until an acid reaction to Congo red paper was obtained and the dark color, which appeared just before the reaction was complete, had faded. Ten milliliters of concentrated sulfuric acid was added and the mixture was refluxed for four hours. The solution was allowed to cool and was analyzed for hydroxylamine by the Raschig method. The 1540 ml. of solution contained 1.6 equivalents of hydroxylamine, giving a yield of 92% on the basis of the sodium nitrite.

(c) Preparation of the dioxime

Eleven hundred milliliters (1.14 equivalents) of the hydroxylammonium acid sulfate solution was diluted with 1900 ml. of water and 61.5 g. (0.5 mole) of nitrosophenol added. The mixture was heated to 47° C. and maintained at this temperature while being stirred continuously. After 16 hours the mixture was allowed to cool to room temperature and left stirring overnight. It was then chilled to 5° C., filtered, and the precipitate washed with water and air-dried. The product was a light brown powder that decomposed explosively at 270° C. The yield was 70 g. or 100% based on the nitrosophenol.

Analysis: Found—18.09% N. Calc'd. for $C_6H_6N_2O_2$: 20.29% N.

The filtrate was treated with 100 ml. of acetone, neutralized with ammonium hydroxide and steam distilled, collecting about 1500 ml. of distillate. The distillate was acidified with hydrochloric acid and the acetone recovered by distillation, 73 ml. of acetone being obtained in the form of about a 30% solution.

The residue containing the hydroxylammonium chloride was analyzed for hydroxylamine by the Raschig method and found to contain 35 g. (0.51 mole). The yield of p-quinone dioxime on the basis of the hydroxylamine used was, therefore, 80%. The hydroxylammonium chloride may be obtained from this solution as a dry salt by evaporation of the solution on a steam bath with very little loss.

In general, the procedure described above is to be recommended. Yields of 90–100% can be obtained. The acidity of the hydroxylammonium sulfate solution would be less if the excess hydroxylamine were recovered as suggested above, and this would be advantageous, since excess acid seems to slow the rate of reaction. A temperature of 45°–65° C. is recommended, and the optimum time is in the range of 1 to 12 hours. The reaction mixture should be chilled to 5° C. at just the right time and filtered to obtain best yields and best quality. Glass-lined equipment is recommended.

Preparation in alcohol solution

Thirty grams (0.24 mole) of nitrosophenol and 35 grams (0.5 mole) of hydroxylammonium chloride were dissolved in 750 ml. of 95% ethanol and refluxed for three hours. The solution was cooled and diluted with 1250 ml. of cold water, filtered, and the precipitate washed with water and air-dried. This gave 33.5 g. (0.24 mole) of p-quinone dioxime, a brown powder that decomposed explosively at 240° C.

Analysis: Found—19.49% N. Calc'd. for $C_6H_6N_2O_2$: 20.29% N.

The yield was quantitative on the basis of the nitrosophenol. The hydroxylamine can be recovered in good yields. Alcohol is a good solvent for the reaction but requires the use of more expensive hydroxylammonium chloride.

(d) Recovery of hydroxylamine

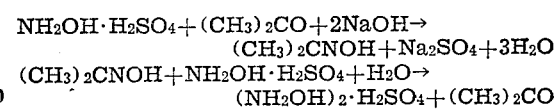

The method described above for the recovery of hydroxylamine follows the procedure of Semon (Organic Syntheses, Collective Volume I, page 311 (1936) for the production of hydroxylammonium chloride.

The large excess of acetone used by Semon is not necessary. In a plant operation only a slight excess is to be used. Instead of using hydrochloric acid to hydrolyze the acetoxime, this may be done with the hydroxylammonium acid sulfate. Semon claims a recovery of 60% for the acetone, but this probably could be improved upon in plant operation. The recovery of the excess hydroxylamine has averaged about 70%, i. e., the yield of p-quinone dioxime on the basis of hydroxylamine is about 80% when 100% excess hydroxylamine has been used.

While both hydroxylammonium sulfate and hydroxylammonium acid sulfate are available to a certain extent large scale production of p-quinone dioxime requires another source. It can be prepared from sodium nitrite in 80–90% yields, as described above. The recovery of excess hydroxylamine from the dioxime reaction can be tied in nicely with the production of hydroxylamine, as indicated by the following equations:

(1) $NaNO_2 + NaHSO_3 + SO_2 \rightarrow HON(SO_3Na)_2$
(2) $HON(SO_3Na)_2 + 2H_2O + H_2SO_4 \rightarrow$
     $NH_2OH \cdot H_2SO_4 + Na_2SO_4 + H_2SO_4$
(3) $NH_2OH \cdot H_2SO_4 + (CH_3)_2C = NOH + H_2O \rightarrow$
     $(NH_2OH)_2 \cdot H_2SO_4 + (CH_3)_2CO$ After the hydrolysis of the sodium hydroxylamine disulfonate in step 2, acetoxime solution, from the recovery of hydroxylamine, may be added and the acetone distilled, converting the acid sulfate to the normal sulfate. Glass-lined equipment is recommended.

(e) Effect of temperature on the reaction rate

The reaction of nitrosophenol with hydroxylammonium chloride or other hydroxylammonium salts can be followed by sampling periodically, filtering the sample and titrating the acid that has been liberated according to the following equation:

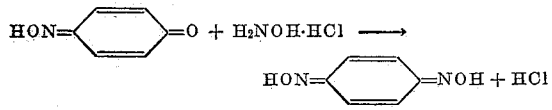

This titration may be carried out using an indicator such as methyl orange or Congo red. However, the end points are somewhat obscured by the color of the solution and therefore more reproducible results can be obtained by electrometric or potentiometric titration. In the experiments described below, the titration was carried out using the Fisher Titrimeter. Standard (0.1 N) sodium hydroxide was used and the end point was taken at a pH of 3.3, the pH of a dilute solution of hydroxylammonium chloride.

The reaction was carried out in a three liter flask fitted with a mechanical stirring device and a thermometer. At higher temperatures a reflux condenser was added. The flask was charged with 42 g. of nitrosophenol and 47 g. of hydroxylammonium chloride. Water (2 liters) was preheated to slightly above the chosen reaction temperature and added rapidly, with stirring. The temperature was then maintained at the desired level by external heating. Samples (20 cc.) were withdrawn periodically, filtered and aliquot portions (5 cc.) titrated with standard sodium hydroxide. From the amount of sodium hydroxide used the per cent conversion of nitrosophenol to p-quinone dioxime was calculated assuming that for each mol of nitrosophenol converted one mol of hydrochloric acid was liberated. The method is not claimed to be highly accurate but it does indicate the trend of the reaction.

Figure 1 shows the per cent conversion plotted against time. Figure 2 is a continuation of Figure 1 for those reactions that required more time than can be plotted in Figure 1. The curves clearly indicate that one can speed up the reaction by increasing the temperature. The increase in reaction rate is much more than would be expected from the rule that a rise in temperature of 10° doubles the reaction rate. This is true especially in the temperature range of 30 to 50°. Sixty per cent conversion requires 36.5 hours at 30° C., 11.2 hours at 40° C., and 2.55 hours at 50° C. This indicates that by raising the temperature from 30° C. to 40° C. the reaction rate is more than tripled and that by raising it from 40° C. to 50° C. the reaction rate is more than quadrupled.

We have found therefore that the production of p-quinone dioxime by reacting nitrosophenol with hydroxylamine is best carried out at temperatures in the range of 40° C. to 100° C. preferably 45° C. to 65° C. Considerable improvement in yields and substantial reduction in reaction time can be achieved by carrying out the reaction under these conditions. Figure 1 illustrates that even greater yields can be secured in shorter time by operating at temperatures around 80° C. to 95° C. but at these temperatures the p-quinone dioxime product is darker in color due to impurities present therein. We have found it desirable to sacrifice reaction time to a slight extent in order to secure a better grade product, and therefore prefer the temperature range of 45° C. to 65° C. For example about 85% conversion is obtained by carrying out the reaction at a temperature of 55° C. for 7-9 hours.

(f) *Effect of using excess hydroxylammonium sulfate*

One flask was charged with 61.5 g. (0.5 mol) of nitrosophenol, 41 g. (0.5 equivalents) of hydroxylammonium sulfate, 50 ml. of concentrated sulfuric acid (1.8 equivalents), and sufficient water to make a volume of three liters.

Another flask was charged the same way, except that 82 g. (1 equivalent) of hydroxylammonium sulfate was used.

The mixtures were stirred at room temperature, and the reaction follows as described under (e) except that titrations were carried out in the usual way using an indicator instead of the Fisher Titrimeter. The results indicate that an excess of hydroxylamine should be used, but it may be that 100% excess is not the most economical.

(g) *Effect of adding free acid to the reaction mixture*

Nietzki and Guiterman recommended adding free acid to the reaction mixture. The following experiments indicate that this is not only unnecessary but also undesirable.

One flask was charged with 61.5 g. (0.5 mol) of nitrosophenol, 82 g. (1 equivalent) of hydroxylammonium sulfate and sufficient water to make three liters.

Another flask was charged with the same quantities of nitrosophenol and hydroxylammonium sulfate, but 50 ml. of concentrated sulfuric acid was added.

The reaction mixtures were stirred at room temperature, and the reaction followed as described under (f). The results indicate that the addition of free acid to the reaction mass considerably reduces the conversion and more than doubles the reaction time.

Since an excess of acid seemed to slow the reaction, it was thought that one might neutralize the acid as it is formed in the reaction. This was tried in several runs, but a poor product resulted. Several buffers were tried. Those that maintained a pH greater than 3, i. e., alkaline to Congo red, (sodium acetate and disodium phosphate) caused the hydroxylamine to disappear rapidly but gave poor yields of an inferior product. Those that maintained a pH less than 3, i. e., acid to Congo red, had little or no effect on the rate of reaction.

Although we have spoken of hydroxylamine as the reactant the amine is usually employed in the form of its salt, e. g., the hydroxylammonium chloride, sulfate, hydrogen sulfate, or as the salt of any other inorganic or organic acid.

What is claimed is:

1. A process for the preparation of para-quinone dioxime which comprises forming a solution containing a hydroxylammonium salt and nitrosophenol, heating the solution to a temperature between 40° C. and 100° C. for a period of approximately 1 to 20 hours to effect reaction of said salt with the nitrosophenol, and recovering para-quinone dioxime as a product of the reaction.

2. A process according to claim 1 in which the hydroxylammonium salt is hydroxylammonium sulfate.

3. A process according to claim 1 in which the hydroxylammonium salt is hydroxylammonium chloride.

4. A process according to claim 1 in which the reaction is carried out at a temperature between about 45° C. and 65° C. for a period of about 1 to 12 hours.

5. A process according to claim 1 in which the reaction is carried out in aqueous solution.

6. A process according to claim 1 in which the reaction is carried out in alcohol solution.

7. A process for the preparation of para-quinone dioxime which comprises forming a solution containing a hydroxylamine salt and nitrosophenol, heating the solution in the absence of extraneously added free acid to a temperature between 40° C. and 100° C. for a period of approximately 1 to 20 hours to effect reaction of said salt with the nitrosophenol and recovering para-quinone dioxime as a product of the reaction.

8. A process according to claim 7 in which the solution is an aqueous solution.

9. A process for preparing p-quinone dioxime which comprises reacting a solution of a hydroxylamine salt with nitrosophenol at a temperature between room temperature and 100° C. in the absence of extraneously added free acid for a period of approximately 1 to 20 hours and recovering p-quinone dioxime as a product of the reaction.

10. A process according to claim 9 in which the solution is an aqueous solution.

SAMUEL B. LIPPINCOTT.
LOUIS A. MIKESKA.

REFERENCES CITED

The following references are of record in the file of this patent:

Nietzki et al., Berichte, 21, pages 428–434 (1888).